United States Patent
Wan

(10) Patent No.: US 6,500,231 B1
(45) Date of Patent: Dec. 31, 2002

(54) RECOVERY OF PRECIOUS METALS FROM THIOSULFATE SOLUTIONS

(75) Inventor: Rong Yu Wan, Highlands Ranch, CO (US)

(73) Assignee: Newmont USA Limited, Denver, CO (US)

( * ) Notice: Subject to any disclaimer, the term of this patent is extended or adjusted under 35 U.S.C. 154(b) by 0 days.

(21) Appl. No.: 09/821,720

(22) Filed: Mar. 29, 2001

(51) Int. Cl.[7] ................................................ C22B 3/46
(52) U.S. Cl. ............................ 75/732; 75/736; 75/737; 75/744
(58) Field of Search ............................ 266/170; 75/724, 75/732, 736, 737, 744

(56) References Cited

U.S. PATENT DOCUMENTS

| | | | |
|---|---|---|---|
| 1,160,849 A | * 11/1915 | Conklin ........................ | 75/736 |
| 4,152,143 A | * 5/1979 | Kausel et al. ................. | 75/724 |
| 4,384,889 A | 5/1983 | Wiewiorowski et al. .. | 75/101 R |
| 4,654,078 A | 3/1987 | Perez et al. ............... | 75/118 R |
| 5,320,665 A | 6/1994 | Mullins ....................... | 75/724 |
| 5,354,359 A | 10/1994 | Wan et al. .................... | 75/744 |
| 5,411,575 A | 5/1995 | Fleming et al. ............... | 75/743 |
| 5,536,297 A | 7/1996 | Marchbank et al. .......... | 75/36 |
| 5,785,736 A | 7/1998 | Thomas et al. ............... | 75/736 |

* cited by examiner

Primary Examiner—Melvyn Andrews
(74) Attorney, Agent, or Firm—Marsh Fischmann & Breyfogle LLP

(57) ABSTRACT

In one aspect, the present invention provides a method for recovering precious metal, and particularly gold, from a particulate substrate loaded with a precious metal-containing coating, in which a portion, but less than substantially all, of the particulate substrate is dissolved away to physically release precious metal-containing coating from the particulate substrate. The particulate substrate loaded with a precious metal-containing coating may be prepared during precious metal recovery operations by cementation of precious metal on a base metal particulate substrate from a pregnant leach solution, such as a leach solution including a thiosulfate lixiviant for the precious metal.

60 Claims, 2 Drawing Sheets

RECOVERY OF PRECIOUS METALS FROM THIOSULFATE SOLUTIONS

FIELD OF THE INVENTION

The invention concerns mineral processing to recover precious metals, including recovery of gold following cementation of the gold out of leach solutions.

BACKGROUND OF THE INVENTION

Precious metals, especially gold, are frequently recovered from precious metal-containing ores, concentrate, and other precious metal-containing mineral materials by leaching the precious metal into a leach solution including a lixiviant for the precious metal. Examples of lixiviants used to leach gold include certain cyanide salts, thiosulfate salts and thiorea. The gold may be recovered from the pregnant leach solution by a variety of techniques, depending upon the lixiviant that is used. For example, a common technique for recovering gold from a cyanide leach solution is to adsorb the gold-cyanide complex onto activated carbon granules, remove the gold-loaded carbon granules from the leach solution and strip the gold off of the granules using a strip solution. Another technique is to contact the pregnant leach solution with an ion exchange resin capable of removing the precious metal from the leach solution.

Yet another technique for recovering precious metals from a pregnant leach solution is cementation. In cementation, pieces of another metal, typically in a particulate form, such as in the form of a powder, granules, or beads, is contacted with the pregnant leach solution under conditions so that some of the other metal dissolves into the leach solution and displaces dissolved precious metal from the solution. Precious metal displaced from the solution deposits on the pieces of the other metal to form a cementation product including a thin precious metal-containing coating supported on the pieces of the other metal. The pieces of the other metal, therefore, act as a substrate on which a coating of the precious metal deposits during the cementation. The other metal, or substrate metal, is typically a base metal, and it is important that the electrode potential between the substrate metal and the precious metal be large enough to adequately drive the cementation reaction. For example, zinc works well as a substrate metal for cementation of gold from cyanide leach solutions and copper works well as a substrate metal for cementation of gold from thiosulfate leach solutions.

One problem with cementation is that it can be expensive to subsequently separate the precious metal from the other metal. The substrate metal, which typically makes up a much larger portion of the cementation product than the precious metal, is a nuisance in the smelting operation and increases the cost of preparing a purified precious metal product. This is one reason why it is often preferred to find an alternative technique for recovering gold from leach solutions. In the case of gold recovery using cyanide leach solutions, problems associated with cementation are typically avoided by removing gold from the leach solution using activated carbon.

In the case of thiosulfate lixiviants, activated carbon is not effective for removing gold from the thiosulfate leach solution, and the use of ion exchange resins is expensive. Cementation, particularly on copper, has been found effective for removing gold from thiosulfate leach solutions, but the copper is a nuisance during smelting and refining operations. To increase the surface area available for cementation and thereby also increase gold loading per unit weight of copper, a fine copper powder has been used for cementation of gold. One problem with using a fine copper powder, however, is that it is difficult to adequately clarify the pregnant thiosulfate leach solution prior to cementation. Very fine filtration is typically required, which is expensive. Also, even when using a fine copper powder, a large quantity of copper must be processed during subsequent smelting and refining operations, significantly adding to the ultimate cost of preparing a purified gold product. This is in addition to the cost of the copper that is consumed. One solution to the clarification problem would be to use relatively large copper beads that could be easily separated from the leach solution by simple screening. This has the effect, however, of significantly increasing copper consumption and also the amount of nuisance copper that must be processed during precious metal smelting and refining operations.

There is a significant need for improved cementation operations for recovering precious metals, and especially for recovering gold from thiosulfate leach solutions, that permit easier clarification of the leach solution, and/or that reduce the quantity of the substrate metal from the cementation operation that must be processed along with the precious metal during smelting and refining operations, and/or that reduce the quantity of the other metal consumed per unit weight of precious metal recovered.

SUMMARY OF THE INVENTION

It has been found with the present invention that the amount of the substrate consumed to recover precious metals by cementation from thiosulfate leach solutions can be significantly reduced, and also the quantity of the substrate metal that must be processed during smelting and refining operations can be significantly reduced, by selectively dissolving from the cementation product a small portion of the substrate metal thereby effecting physical release of the precious metal from the substrate. The released precious metal can then be separated from the substrate for subsequent smelting and refining operations to prepare a purified precious metal product. In this way, the amount of substrate metal (e.g., copper or zinc) that needs to be processed during refining operations is significantly reduced. The separated substrate particles can then be recycled for cementation of additional precious metal, with a result being that less of the substrate metal is consumed per unit weight of precious metal recovered. An additional advantage is that it is possible to use relatively large, or coarse, particles of the substrate metal for the cementation, which significantly simplifies clarification of the leach solution because the larger particles are easier to remove than a fine powder. A simple screen is typically adequate for separating the cementation product from the barren leach solution following cementation. The use of relatively large particles of the substrate metal is possible because only a small amount of substrate metal is consumed during the selective dissolution to release the precious metal, permitting particles of the substrate metal to be reused several times for cementation of the precious metal.

In one aspect, the present invention provides a method for removing a precious metal from a cementation product including a substrate loaded with a precious metal-containing coating. The method involves selectively dissolving into a dissolution solution only a portion of the substrate to effect physical release of at least a portion of the precious metal-containing coating. Preferably only a small portion of the substrate is dissolved, while only a negligible amount or none of the precious metal is dissolved. The released precious metal, which remains in a solid form, can then be separated from the dissolution solution for further processing.

In one specific embodiment, the particulate substrate is a particulate base metal and the precious metal-containing coating comprises gold that has been loaded onto the particulate base metal by cementation. When cementation of the gold is from a thiosulfate leach solution, the particulate substrate will preferably be a particulate copper. When cementation of the gold is from a cyanide leach solution, the particulate substrate will preferably be particulate zinc. When the particulate substrate is a base metal, and particularly when the particulate substrate is copper or zinc, a preferred dissolution solution is an ammonium carbonate solution. In most instances,: it is necessary to dissolve only a few percent or less of the particulate substrate to effect release of the gold, and the particulate substrate can be reused many times for further cementation. As separated from the dissolution solution, the gold is ordinarily in fine particulate sludge that may be about 3 times or more concentrated in gold than current typical cementation product produced using a fine base metal particulate. In one embodiment of the present invention, base metal components of the fine particulate sludge can be selectively dissolved to produce a product with an even higher gold content. Smelting and refining can be expected to be significantly less expensive for processing this more concentrated product than current conventional cementation product.

In another aspect, the present invention provides a method for recovering gold from a gold-containing mineral material that involves leaching the mineral material to dissolve at least a portion of the gold into the leach solution to form a pregnant leach solution, followed by contacting the pregnant leach solution with a particulate substrate in a manner to remove at least a portion of the gold from the pregnant leach solution and load gold onto the particulate substrate, such as by cementation. The gold-loaded particulate substrate is then separated from the leach solution and contacted with a dissolution solution to dissolve a portion, and preferably only a small portion, of the particulate substrate, so that at least a portion of a gold-containing coating is physically released from the particulate substrate in the form of a fine particulate. The particulate substrate can then be separated from the dissolution solution and the fine particulate, such as by screening out the coarser particulate substrate. The precious metal-containing fine particulate can then be separated from the dissolution solution, such as by filtration.

These and other aspects of the invention are further described below. Also, although the invention is described primarily with respect to recovery of gold, the same principles apply to recovery of other precious metals in operations in which the precious metal is coated on a particulate substrate, so long as a portion of the substrate material is selectively dissolvable in a manner to physically release the precious metal in solid form from the particulate substrate. Furthermore, the invention is described primarily with reference to removal of precious metal from a cementation product but in a broad sense the invention is not so limited and includes the processing of any precious metal-containing material having a substrate and a precious metal-containing surface coating supported on the substrate, wherein a small portion of the substrate is selectively dissolvable to physically release precious metal-containing coating, and especially when the substrate is a base metal material.

DETAILED DESCRIPTION OF THE SPECIFIC EMBODIMENTS

Figure 1:
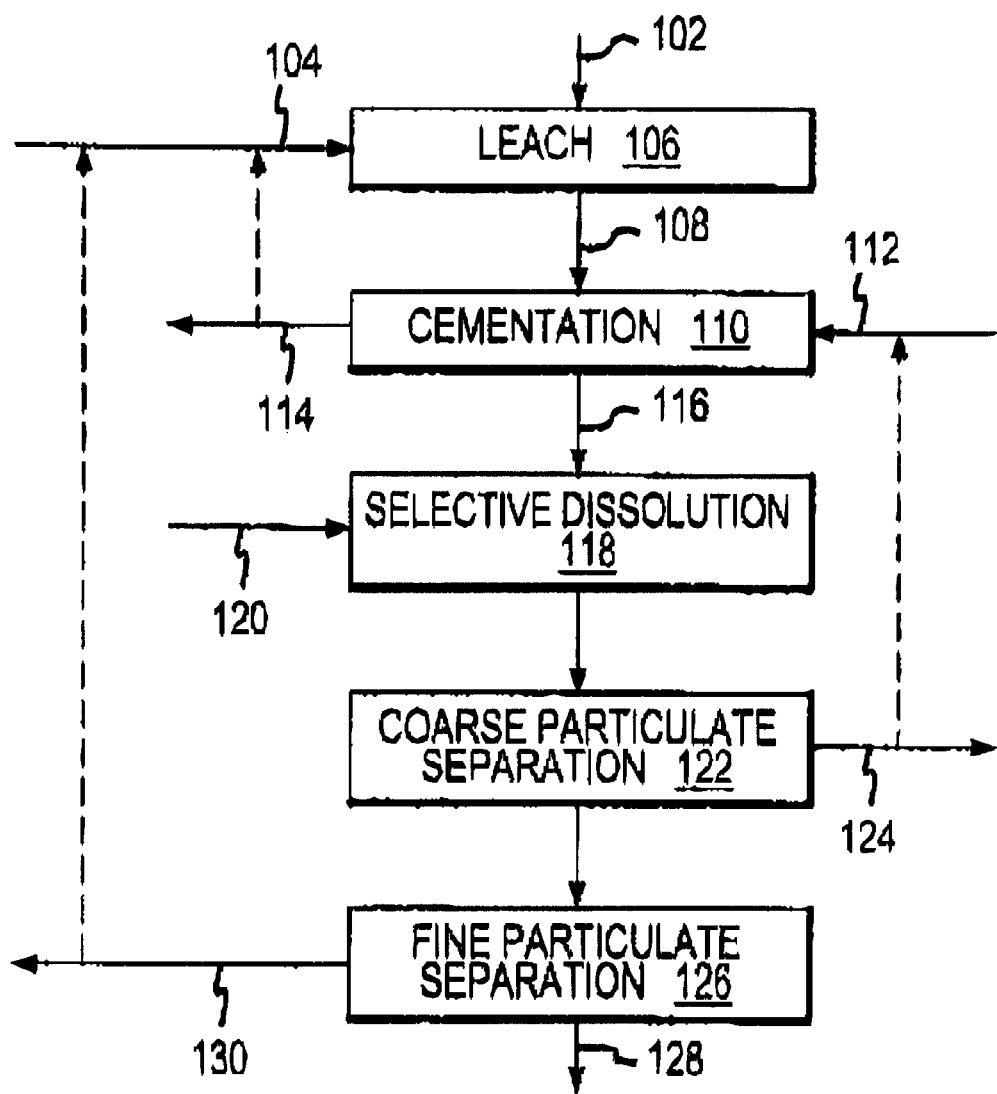
FIG. 1 is a generalized process flow diagram of one embodiment of the method of the present invention.

As used herein, "precious metal" means at least one of gold and silver.

As used herein, "particulate" means that a material is in the form of distinct particles, for example, in the form of a powder, granules, beads, etc., which may be in a dry form or may be slurried in a liquid for processing. The particles need not be uniform in size or of any particular shape. For example, the particles could be spheroidal, elongate cylinders or completely irregular in shape.

As used herein, "particulate substrate" means material in a particulate form capable of supporting a precious metal-containing coating, such as is created during cementation recovery of a precious metal.

As used herein, "dissolve" and "dissolution", and variations thereof mean the material dissipates or disperses into a solution. Such dissipation can be simply due to the material's solubility or due to a chemical reaction, e.g., changing the material to a salt form or complexation of the material.

As used herein, "loaded" in relation to a particulate substrate being loaded with a precious metal or loaded with a precious metal-containing coating means the precious metal or the coating, as the case may be, adheres to a surface of the particulate substrate. The adhesion can be by any adhering mechanism such as by chemical bonding due to a chemical reaction between the precious metal and the particulate substrate or by physical adhesion from precipitation or deposition of the precious metal onto the particulate substrate.

As used herein, "mineral material" means any material having a mineral origin, including ores, ore concentrates, tailings from prior mineral processing operations, and/or other residue from prior mineral processing operations.

As used herein, "coating" in relation to a precious metal-containing coating on a substrate means the precious metal is present in a material phase that is adhered to at least a portion of an outer surface of the particulate substrate. The "coating" need not be continuous or uniform in thickness or composition.

As used herein, "selectively dissolving" and "selective dissolution" each refers to leaching operation in which one material (e.g., substrate material) is preferentially dissolved into solution relative to another material (e.g., precious metal).

In one embodiment, the present invention provides a method for separating a precious metal from a particulate substrate that is loaded with a precious metal-containing coating. In a broad sense the method comprises dissolving into a dissolution solution a portion, but less than substantially all, of the particulate substrate sufficiently to degrade adherence between the coating and the particulate substrate to at least an extent to effect physical release from the substrate of at least a portion, and preferably substantially all, of the precious metal. The precious metal-loaded particulate substrate is typically cementation product from mineral processing operations for recovery of precious metal. The method of the present invention could, however, be applied to remove precious metal from other structures, including a precious metal-containing coating supported on a substrate that is selectively dissolvable to physically release at least a portion of the coating.

Typically, the precious metal is released in the form of a precious metal-containing fine particulate, permitting easy separation from the coarser particulate substrate by simple size separation such as by the use of a size separation screen having openings small enough to retain the particulate substrate and large enough to pass the fine particulate containing the precious metal. In one embodiment, it has been found that release of the precious metal can be beneficially assisted by mechanical agitation. For example, a slurry of the precious metal-coated particulate substrate and the dissolution solution can be mixed, shaken or vibrated to assist the physical release of the precious metal as the adherence of the coating is being degraded by dissolution of a portion of the particulate substrate. Preferably, the agitation also assists in formation of the precious metal-containing fine particulate through mechanical attrition. The particulate substrate will typically have a weight average particle size of at least about one order of magnitude larger than the fine particulate, preferably at least about two orders of magnitude larger than the fine particulate, and often even larger, so that it is easy to make a size separation between the particulate substrate and the fine particulate.

After separation of the particulate substrate from the precious metal-containing fine particulate, then the fine particulate can be separated from the dissolution solution, such as by filtration, to provide a recovered precious metal-containing product and a recovered dissolution solution. The recovered precious metal-containing product can then be processed to prepare a refined precious metal product, such as by smelting and/or other techniques.

The method of the present invention typically involves dissolving only a small portion of the particulate substrate, and preferably only an amount just sufficient to effect the desired physical release of the precious metal. By not requiring dissolution of substantially all, or even a large portion, of the particulate substrate, less of the particulate substrate is consumed per unit weight of precious metal processed, thereby reducing costs. Furthermore, by dissolving only a small portion of the particulate substrate, most of the particulate substrate mass is recovered in a particulate form that is sufficiently coarse to be recycled for use to load with additional precious metal, such as by further cementation. Typically, the amount of the particulate substrate dissolved to effect release the precious metal is no greater than about 25 weight percent of the particulate substrate, preferably no greater than about 10 weight percent, more preferably no greater than about 5 weight percent, even more preferably no greater than about 2 weight percent, and most preferably no greater than about 1 weight percent of the particulate substrate. Even though only a small portion of the particulate substrate is dissolved, most or substantially all of the precious metal is typically released. Typically at least 90 weight percent of the precious metal is released, more preferably at least 95 weight percent of the precious metal is released and preferably at least 98 weight percent of the precious metal is released. In many cases, it is possible to release substantially all of the precious metal during the selective dissolution.

The particulate substrate will typically comprise a non-precious metal, and preferably a base metal, in metallic form suitable for cementation:of the precious metal to be recovered. The non-precious substrate metal can be any metal suitable for cementation of the precious metal and that can be selectively dissolved in the dissolution solution to effect the physical release of the precious metal from the substrate. Exemplary base metals suitable for use as the particulate substrate to recover gold from thiosulfate leach solutions include copper, zinc, and iron, with copper being particularly preferred. When recovering gold from a cyanide leach solution, however, zinc is a preferred base metal for use as the particulate substrate.

As noted above, the dissolution of a portion of the particulate substrate in the dissolution solution should occur without dissolving any significant portion of the precious metal into the dissolution solution. Preferably, less than about 1 weight % of the precious metal is dissolved into the dissolution solution. More preferably, there is only a negligible or no dissolution of the precious metal into the dissolution solution.

For each particular application of the method of the invention, the dissolution solution should be selected to provide the desired selectivity to dissolve material of the particulate substrate relative to the precious metal to be recovered. Selection of the dissolution solution will, therefore, depend upon the particular composition of the particulate substrate and the particular precious metal to be recovered. For example, for recovery of gold deposited by cementation onto particulate copper or zinc, preferred dissolution solutions include ammoniacal aqueous solutions. A particularly preferred ammoniacal aqueous solution includes at least one, and preferably both, of dissolved ammonia and a dissolved ammonium salt. The pH of the ammoniacal aqueous solution used as the dissolution solution is typically in the range of from about pH 5 to about pH 12, with an alkaline pH being more preferred.

The particulate substrate should be sized for easy separation from the fine particulate that contains the precious metal. Preferably, the weight average particle size of the particulate substrate, and more preferably the size of substantially all particles of the particulate substrate, is at least about 100 mesh (0.149 mm), more preferably at least about 48 mesh (0.297 mm), even more preferably at least about 20 mesh (0.841 mm) and most preferably at least about 10 mesh (1.18 mm). By referring to the particles as being at least a particular size, it is meant that the particles will be retained on a screen having openings of the designated size. Using such relatively coarse particles for the particulate substrate makes handling and processing much easier. This is a significant advantage over the use of fine base metal powers for cementation of precious metal. Typically, the particles of the particulate substrate will have a maximum dimension, that is smaller than 10 mm and more typically smaller than 5 mm. Also, although the invention is described with respect to a substrate in particulate form, in a broad sense the invention is not so limited. Having the substrate in a course particulate form is preferred for providing a relatively high surface area for cementation and for easy handling and manipulation of the substrate. The substrate in par could, however, be in any form. And the concepts discussed with respect to use of a particulate substrate apply equally to other substrate forms, making accommodation only for the different form of the substrate. Such alternative forms for the substrate include, for example, metal bars, plates, or wire strands, although such alternative forms are not preferred.

In one embodiment of the present invention, the method includes loading the precious metal onto the particulate substrate prior to the contacting with the dissolution solution. In this embodiment the method includes leaching a precious metal-containing mineral material with a leach solution to dissolve precious metal to prepare a pregnant leach solution. The precious metal is then removed from the pregnant leach solution and loaded onto the particulate substrate, preferably by cementation, followed by selective dissolution of a portion of the particulate substrate to release the precious metal, as discussed above. The mineral material being leached could be a whole ore, an ore concentrate, a tailing from prior processing or other residue from prior mineral processing. For example, the mineral material could be a gold-bearing residue from prior oxidation of a refractory sulfide gold ore. The oxidation could be accomplished by any technique, such as bio-oxidation, roasting, pressure oxidation or chemical oxidation.

The leach solution can be any solution, typically an aqueous solution, capable of dissolving the precious metal from the mineral material. Some exemplary aqueous leach solutions that are useful in gold recovery operations include cyanide leach solutions, thiourea leach solutions, and thiosulfate solutions, with thiosulfate leach solutions being preferred for use with the present invention. For preparing cyanide and thiosulfate leach solutions, ammonium and alkali metal salts are typically used. Examples of cyanide reagents used to prepare cyanide leach solutions include sodium cyanide and potassium cyanide. Examples of thiosulfate reagents used to prepare thiosulfate leach solutions include ammonium thiosulfate, sodium thiosulfate, potassium thiosulfate and calcium thiosulfate. Preparation of precious metal leach solutions is well known in the mineral processing industry.

One particularly preferred embodiment of the present invention provides a method for recovering gold from a thiosulfate leach solution using coarse particulate copper as the particulate substrate. It has been found with the present invention, for example, that during cementation of gold from thiosulfate leach solutions using copper, progressive formation of a passivating substance occurs on the copper surface. Without being bound by any theory, it is believed that the passivating substance comprises copper oxide and/or copper sulfide. As this passivating layer grows, the rate of gold cementation on the copper surface slows. Thus, even if gold could be selectively dissolved to separate it from a particulate copper substrate, the copper would not be of practical use for further cementation due to the presence of the passivation layer. It has been found with the present invention, however, that when a portion of a copper substrate is selectively dissolved to physically release the precious metal, it is possible to remove the passivation layer. A preferred dissolution solution includes an aqueous solution with dissolved ammonia and a dissolved ammonium salt, such as a sulfate, nitrate or carbonate salt, with the carbonate salt being preferred because such solutions will ordinarily not dissolve any appreciable quantity of the precious metal. Removal of the passivation layer helps to restore to the copper substrate a high activity for further cementation. Thus, with the present invention it is possible to remove gold from particulate copper substrate and simultaneously remove the passivation layer, so that the particulate copper substrate can be recycled for cementation of additional gold. A fresh copper surface is created that is desirable for high activity during cementation operations.

In one particular aspect of gold recovery, the ammoniacal dissolution solution is an aqueous solution comprising dissolved ammonia and dissolved ammonium carbonate. It is believed that a fresh copper surface is created by dissolving at least some of the outer lay of the copper surface according to the following reactions:

$2NH_3 + (NH_4)_2CO_3 + Cu + \frac{1}{2}O_2 \rightarrow Cu(NH_3)_4CO_3 + H_2O$ $4NH_3 + 2(NH_4)_2CO_3 + Cu_2O + \frac{1}{2}O_2 \rightarrow 2Cu(NH_3)_4CO_3 + 2H_2O$ $2NH_3 + (NH_4)_2CO_3 + CuO \rightarrow Cu(NH_3)_4CO_3 + 2H_2O$ It is believed that thermodynamically and/or kinetically the dissolution of copper is significantly favored relative to dissolution of gold, thereby allowing selective dissolution of copper to effect a physical release of the gold coating from the surface of the copper particles.

Referring now to FIG. 1, a generalized process flow diagram is shown for one embodiment of the method of the present invention. A particulate, precious metal-containing, mineral material feed 102 is contacted with a leach solution 104 in a leaching step 106. In the leaching step 106, at least a portion of the precious metal from the mineral material feed 102 is dissolved into the leach solution 104. A pregnant leach solution 108, including the dissolved precious metal, is processed in a cementation step 110. In the cementation step 110, the pregnant leach solution 108 is contacted with a particulate base metal 112 of an appropriate type and under conditions sufficient to cause cementation of the precious metal onto the particulate base metal 112. Barren leach solution 114, from which most of the precious metal has been removed in the cementation step 110, is removed from the cementation step 110, optionally with some or all of the barren leach solution 114 being recycled, after proper treatment as necessary, for use as part of the leach solution 104. Precious metal-loaded cementation product 116 is removed from the cementation step 110 and fed to a selective dissolution step 118. In the selective dissolution step 118, the cementation product 116 is contacted with a dissolution solution 126 of a type and under conditions sufficient to selectively dissolve a small portion of base metal substrate material from the cementation product 116, without significant dissolution of the precious metal, to effect physical release of most and preferably substantially all of the precious metal contained in the cementation product 116. In a coarse particulate separation step 122, stripped particulate base metal 124, which is preferably substantially free of the precious metal, is separated, such as by screening, from the dissolution solution and from the fine particulate including the released precious metal. This could be accomplished, for example, by screening out the stripped particulate base metal, preferably with a water wash of the particulate base metal to remove residual gold. Optionally, some or all of the stripped particulate base metal 124 is recycled to form part of the particulate base metal 112. After removal from the selective dissolution 118, the stripped particulate base metal could be sized on a qualification screen, with oversize particles being recycled and undersize particles being rejected from further use. In a fine particulate separation step 126, a precious metal-containing fine particulate sludge 128 is separated from the dissolution solution, such as by filtration. The fine particulate sludge 128 can then be dried and sent to a precious metal refining operation, such as a smelter or other operation, to prepare a purified precious metal product. Optionally, all or a portion of effluent dissolution solution 130, after proper treatment as necessary, is recycled for use as part of the leach solution 104. Recycle to the leach solution 104 of at least a portion, and preferably all, of the effluent dissolution 130 is advantageous, because copper-ammonia complex in the effluent dissolution solution 130 can be beneficially used as an oxidizer in the leach solution 104.

With continued reference to FIG. 1, the selective dissolution 118 is preferably conducted with agitation to promote physical removal of the precious metal-containing coating from the cementation product 116. This may be accomplished, for example, by mixing, sparging a gas during the operation, ultrasonic vibration of the mixture, shaking the process vessel, or any other technique. Also, the selective dissolution could be performed in a single stage or would involve a multi-stage operation. For example, the selective dissolution 118 could include a first selective dissolution stage in which the cementation product 116 is contacted with a first portion of the dissolution solution 120 to effect physical removal from the cementation product 116 of a majority of the precious metal. The resulting particulate base metal particles might still contain a small amount of the precious metal. The particulate base metal could be separated by screening, typically accompanied by a water wash to remove residual gold, and the particulate base metal could then be subjected to a second selective dissolution stage. In the second selective dissolution stage, the particulate base metal, still loaded with at least some of the precious metal, would be contacted with a second portion of the dissolution solution 120 to physically remove additional precious metal from the particulate base metal. The resulting stripped particulate base metal 124 would then be separated in the coarse particulate separation step 122, as previously discussed. It is possible that the first portion of the dissolution solution used in such a first selective dissolution stage could have a different composition than the second portion of the dissolution solution used in such a second selective dissolution stage.

Figure 2:
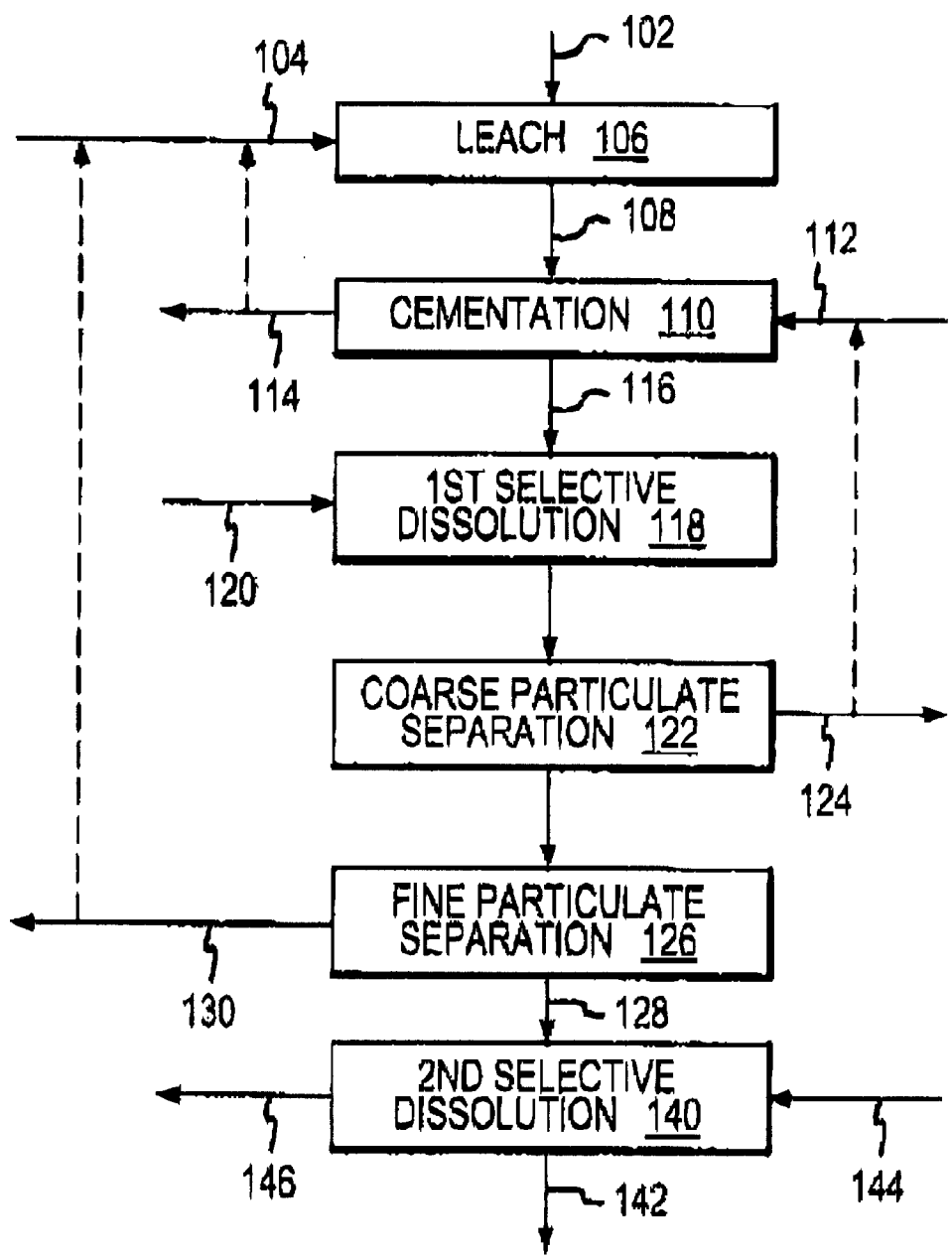
FIG. 2 is a generalized process flow diagram of another embodiment of the method of the present invention.

Referring now to FIG. 2, a generalized process flow diagram is shown for another embodiment of the present invention. The general process as shown in FIG. 2 is the same as that shown in FIG. 1, except that the process shown in FIG. 2 includes two selective dissolution steps. Reference numerals in FIG. 2 are the same as those in FIG. 1, except as noted.

As shown in FIG. 2, after the cementation 110, the precious metal-loaded particulate base metal 116 is fed to a first selective dissolution step 119, which is the same as the selective dissolution step 118 of FIG. 1. The first selective dissolution step 119 could include multiple stages, as discussed previously. Following the fine particulate separation step 126, the precious metal-containing fine particulate sludge 128 is subjected to a second selective dissolution step 140 where additional base metal is dissolved from the fine particulate sludge 128 to prepare a concentrated product 142 that is more concentrated in the precious metal than is the fine particulate sludge 128. During the second selective dissolution 140, at least a portion of the fine particulate sludge 128 is contacted with a selective leach solution 144 to selectively leach from the fine particulate sludge 128 at least a portion of the base metal, while substantially not dissolving, or dissolving only a very small amount of, the precious metal from the fine particulate sludge 128. Exiting the second selective dissolution 140 is a pregnant selective leach solution 146 including dissolved base metal removed from the fine particulate sludge 128. Preferably, at least 50% of the base metal is removed during the second selective dissolution step 140, and more preferably at least 75% of the base metal is removed. In a preferred embodiment, the base metal comprises no more than 10 weight percent of the concentrated product 142, which condition is particularly desirable for reducing costs associated with subsequent smelting and refining operations to produce a purified precious metal product.

With continued reference to FIG. 2, the selective leach solution 144 may be any solution suitable for selectively dissolving the base metal, but will typically be an acidic aqueous solution in which the base metal is readily soluble and in which the precious metal is substantially insoluble or only slightly soluble. For example, when the base metal is copper and the precious metal is gold, a concentrated nitric acid solution can be used as the selective leach solution 144. Such a concentrated nitric acid solution will rapidly dissolve most of the copper, including copper-containing compound (s) such as copper sulfides and oxides that may be present in the fine particulate sludge 128, substantially increasing the gold concentration in the concentrated product 142. The effect is that the gold concentration in the concentrated product 142 is much higher than in the fine particulate sludge. For example, tests using concentrated nitric acid have produced resulted in a product with less than 10 weight copper and containing approximately 6,000 to 18,000 ounces of gold per ton of the product.

Additional objects, advantages, and novel features of this invention will become apparent to those skilled in the art upon examination of the following examples thereof, which are not intended to be limiting.

EXAMPLES

Example 1

Two sets of gold-loaded copper particles are prepared (labeled as A-770 and B-720) by cementation of gold onto clean copper particles. The copper particles are obtained by cutting scrap copper wire into pieces generally in a size range of about 6 mesh to 10 mesh (3.36 mm to 1.68 mm). The gold has been loaded onto the copper particles by cementation from an ammonium thiosulfate solution pregnant with dissolved gold. Samples of the gold-loaded copper particles are then stripped by contacting the particles with a dissolution solution to physically release the gold. For each test, a sample of about two grams of the gold-loaded copper particles are paced in either a 250 mL or 500 mL flask along with the dissolution solution at a weight ratio of dissolution solution to gold-loaded copper particles of about 10:1. The dissolution solution is an aqueous solution containing either 1.7 g/L $NH_3$ (0.1 M $NH_3$) or 3.4 g/L $NH_3$ (0.2 M $NH_3$) and either 9.6 g/L $(NH_4)_2$ or 19.2 g/L $(NH_4)_2CO_3$ (0.2 M $(NH_4)_2CO_3$). For each test, the flask containing the gold-loaded copper particle(s) and dissolution solution is placed on a shaker table (Control-Speed Lab-Line Environ Shaker Table) for either 30 minutes or 60 minutes, after which the contents of the flask are removed. Fine particle sludge appears in the flask from gold-containing coating that has been released from the copper particles. The copper particles are separated from fine particle sludge through a 20-mesh (0.841 mm) screen. The copper particles are retained on the screen and the fine particulate sludge and dissolution solution pass through the screen. The copper particles are washed on the screen with water to remove residual gold-containing sludge. The fine particulate sludge is then recovered by filtration. Fine particulate sludge recovered for all tests on A-770 samples are combined and assayed for gold content. Fine particulate sludge recovered for all tests on B-720 samples are combined and assayed for gold content. The dissolution solution from each test is analyzed for dissolved gold and copper content. Results for ten tests (five on each set of gold loaded particles) are tabulated in Table 1.

As seen in Table 1, the fine particulate sludge assayed about 3242 ounces of gold per ton for the combined A-770 samples and about 2622 ounces of gold per ton for the combined B-720 samples. This compares favorably to cementation product currently produced at Newmont Mining Corporation's Carlin Mine located in Nevada, U.S.A. At the Carlin Mine, gold is recovered by thiosulfate leaching followed by cementation of the gold onto a copper powder sized at about 10 microns. At Carlin, the cementation product is recovered by filtration in a frame filter press with the addition of diatomaceous earth as a filter aid. This recovered cementation product at Carlin typically contains only about 1000 ounces of gold per ton of product recovered from the frame filter press. Results of the tests are noteworthy not only because of the high gold content in the sludge, but also because of the relatively uncomplicated process involved, providing significant operational advantages over the use of fine copper powder for cementation.

Also as shown in Table 1, analysis of the dissolution solution shows no detectable dissolution of gold in any of the tests. In all tests, the gold remains in a solid form throughout. Also, a maximum of only 2.8% of the copper originally in the particulate copper particles is dissolved into the dissolution solution (Test 4) with most tests showing significantly lower levels of copper dissolution. Except for tests 5 and 10, the dissolution of copper is sufficiently high to effect good physical separation of the gold. Tests 5 and 10 include no ammonium carbonate in the dissolution solution, resulting in insufficient dissolution of copper, for any significant physical release of gold. For all tests except Tests 5 and 10, after treatment with the dissolution solution the copper particles have a bright, shiny copper color.

the columns to contact the copper particles for cementation of gold onto the copper particles. The pregnant thiosulfate solution is initially passed through the first column and then inserses through the second and the third columns. The residence time in the packed portion of each column is about 1 minute and 10 seconds. Each cycle continues for about 23–24 hours of cementation, and then the gold-loaded copper particles are removed from the first column for stripping gold (i.e., removing the gold from the copper particles by selective dissolution of a small portion of the copper). The recovered gold sludge is analyzed for gold and copper content. The stripped copper particles are then used in the next cementation cycle. This is accomplished by moving the second column into the first position in series and the third column into the second position in series and loading the stripped copper particles into what was previously the first column, which takes the third position in the new series. The procedure is repeated until completion of four cycles, so that the copper particles originally in the first position in series during the first cycle cementation have been rotated through all three positions and again occupy the first position in series during the fourth cycle cementation.

TABLE 1

| Test No. | Loaded Cu-Beads ID | Weight grams | Dissolution Solution Weight grams | NH$_3$ M | NH$_3$ g/l | (NH$_4$)$_2$CO$_3$ M | (NH$_4$)$_2$CO$_3$ g/l | Stripping Time mins | Eluant[4] Au mg/L | Eluant[4] Cu mg/L | Dissolved Au %[1] | Dissolved Cu[2] %[1] | Sludge Recovered Au Opt[2] | Sludge Recovered Cu %[1] |
|---|---|---|---|---|---|---|---|---|---|---|---|---|---|---|
| 1 | A-770 | 2.0067 | 20.0 | 0.1 | 1.7 | 0.1 | 9.6 | 30 | 0 | 706 | 0 | 0.70 | Mixed Sludge | |
| 2 | A-700 | 2.0212 | 20.0 | 0.1 | 1.7 | 0.1 | 9.6 | 60 | 0 | 1295 | 0 | 1.28 | | |
| 3 | A-700 | 2.0196 | 20.0 | 0.2 | 3.4 | 0.2 | 19.2 | 30 | 0 | 1250 | 0 | 1.24 | | |
| 4 | A-700 | 2.0009 | 20.0 | 0.2 | 3.4 | 0.2 | 19.2 | 60 | 0 | 2800 | 0 | 2.8 | | |
| 5 | A-700 | 2.0280 | 20.0 | 0.2 | 3.4 | 0 | 0 | 60 | 0 | 15 | 0 | 0.01 | 3243.63 | 50.95 |
| 6 | B-720 | 2.0226 | 20.0 | 0.1 | 1.7 | 0.1 | 9.6 | 30 | 0 | 747 | 0 | 0.74 | Mixed Sludge | |
| 7 | B-720 | 2.0109 | 20.0 | 0.1 | 1.7 | 0.1 | 9.6 | 60 | 0 | 1300 | 0 | 1.29 | | |
| 8 | B-720 | 2.0117 | 20.0 | 0.2 | 3.4 | 0.2 | 19.2 | 30 | 0 | 1700 | 0 | 1.69 | | |
| 9 | B-720 | 2.0123 | 20.0 | 0.2 | 3.4 | 0.2 | 19.2 | 60 | 0 | 2795 | 0 | 2.78 | | |
| 10 | B-720 | 2.0033 | 20.0 | 0.2 | 3.4 | 0 | 0 | 60 | 0 | 26 | 0 | 0.03 | 2622.11 | 57.71 |

[1]By weight
[2]Based on weight of original copper bead
[3]Ounces per ton
[4]Dissolution solution following completion of stripping operation Example 2

This example demonstrates that copper particles reused after removal of cementation gold have a high activity for further cementation. Cyclic cementation-stripping tests are preformed on coarse copper particles. Freshly prepared coarse copper particles are initially used in a first cementation cycle (Cycle-1), during which the copper particles are loaded with gold by cementation and then the gold is stripped from the gold-loaded copper particles by selective dissolution of a small portion of the copper into an ammonia-ammonium carbonate solution. The stripped copper particles are recovered and recycled for further cementation of gold. A total of 4 cycles of cementation-stripping are tested.

Cementation is conducted in three columns arranged in series. The size of each column is 1.4 cm diameter×10 cm long. About 90 g of the fresh copper particles are placed in each column. The copper particles are generally sized in a range of about 6 to 10 mesh (3.36 mm to 1.68 mm). A pregnant thiosulfate solution (approximately 0.1 M ammonium thiosulfate) containing about 2 ppm of dissolved gold is prepared and the pH is adjusted using ammonia to about pH 8.8. The pregnant thiosulfate solution is passed through In this way, the activity stripped copper particles for reuse as a cementation substrate is evaluated. Thiosulfate solution samples are taken at various times during each cycle and at the end of each cycle and the samples are analyzed to determine dissolved gold and copper content, from which gold recovery from the thiosulfate solution and the level of copper dissolution are determined. Table 2 shows attributes of the pregnant thiosulfate solution fed to each of the cementation cycles.

TABLE 2

| | Pregnant ATS Solution | | | |
|---|---|---|---|---|
| Test No. | Au ppm[1] | ATS[1] g/L | pH | Cu mg/L |
| Cycle-1 | 2.02 | 14.66 | 8.84 | 68.42 |
| Cycle-2 | 2.01 | 14.89 | 8.83 | 81.00 |
| Cycle-3 | 2.15 | 14.69 | 8.55 | 52.79 |
| Cycle-3 | 2.14 | 14.41 | 8.56 | 49.82 |

[1]Ammonium thiosulfate

Different procedures are tested for stripping gold from the gold-loaded copper particles removed from the first column during each cycle. The procedure followed for each cycle is as follows:

Cycle-1

The gold-loaded copper particles are removed from the first column, rinsed with water overnight, and stripped with an ammonical dissolution solution (0.2 M $NH_3$ and 0.2 M $(NH_4)_2CO_3$) at room temperature. The weight ratio of dissolution solution to solids is 5:1. During the stripping, a small portion of the copper is selectively dissolved into the dissolution solution to effect physical release of gold in a solid state. The stripping is performed in a shaker flask that is shaken for one hour. The stripped copper particles have a bright and shiny copper color.

Cycle-2

The gold-loaded copper particles, are removed from the first column but are not washed, and remain wet with the ammonium thiosulfate solution for two hours prior to stripping. The stripping uses a dissolution solution and stripping conditions as described for the Cycle-1 test. The stripped copper particles appear clean, but slightly tarnished.

Cycle-3

The gold-loaded copper particles are removed from the first column and are rinsed with water and then stripped. During the stripping, the gold-loaded copper particles are mixed with the dissolution solution (same composition as for Cycle 1) at a 5:1 liquid to solids ratio and air is bubbled through the mixture for one hour at room temperature. The stripped copper particles appear clean, with a tarnished shiny bronze color.

Cycle-4

The gold-loaded copper particles are removed from the first column, rinsed with water, exposed to air for 2 hours and then stripped as in Cycle 3. The stripped copper particles appear clean, with a tarnished shiny bronze color.

Because the quantity of gold-containing sludge obtained from each stripping cycle was small, the sludges from all four stripping cycles are combined and assayed. The combined sludge assays at 2071.1 ounces of gold per standard ton and 59.1 weight percent copper.

Table 3 summarizes results concerning cementation activity during each of the cementation cycles. As seen in Table 3, the results indicate that cementation activity of copper particles being reused after stripping is similar to the activity of the original, freshly prepared copper particles, based on gold recovery from the thiosulfate solution. Gold recovery is determined by comparing the gold concentration in the barren thiosulfate solution with that in the original pregnant thiosulfate solution.

TABLE 3

| Test No. | Column No. | Cu Particles grams | Sample Collected after hrs | Vol. liters | ATS g/L | pH | Au mg/L | Cu mg/L | Gold Recovery % |
|---|---|---|---|---|---|---|---|---|---|
| Cycle-1 | 1 | 90.9939 | 3 | | 14.84 | 8.82 | 0.18 | 73.43 | 91.09 |
| | | | 19 | | 14.60 | 8.84 | 0.13 | 71.56 | 93.56 |
| | | | 23 | | 14.48 | 8.74 | 0.12 | 94.60 | 94.06 |
| | 2 | 90.8396 | 3 | | 14.75 | 8.82 | 0.02 | 76.76 | 99.01 |
| | | | 19 | | 14.70 | 8.83 | <0.01 | 72.97 | ~100 |
| | | | 23 | | 14.44 | 8.73 | 0.01 | 88.62 | ~100 |
| | 3 | 90.7721 | 3 | | 14.86 | 8.81 | <0.01 | 79.69 | ~100 |
| | | | 19 | | 14.73 | 8.84 | <0.01 | 73.82 | ~100 |
| | | | 23 | | 14.44 | 8.74 | <0.01 | 85.14 | ~100 |
| | Total Barren Solution | | | 7.200 | 14.63 | 8.80 | <0.01 | 77.52 | ~100 |
| Cycle-2 | 1 | 90.8951 | 5 | | 14.77 | 8.83 | 0.20 | 82.50 | 90.05 |
| | | | 23.25 | | 14.25 | 8.83 | <0.01 | 84.50 | ~100 |
| | 2 | 90.9465 | 5 | | 14.77 | 8.83 | <0.01 | 85.20 | ~100 |
| | | | 23.25 | | 14.27 | 8.83 | <0.01 | 86.60 | ~100 |
| | 3 | 90.8396 | 5 | | 14.77 | 8.83 | <0.01 | 89.30 | ~100 |
| | | | 23.25 | | 14.22 | 8.83 | <0.01 | 90.80 | ~100 |
| | Total Barren Solution | | | 7.200 | 14.79 | 8.84 | <0.01 | 102.80 | ~100 |
| Cycle-3 | 1 | 90.9465 | 5 | | 14.48 | 8.55 | 0.27 | 55.78 | 87.44 |
| | | | 23 | | 14.44 | 8.51 | 0.03 | 56.51 | 98.60 |
| | 2 | 90.8396 | 5 | | 14.51 | 8.54 | <0.01 | 58.47 | ~100 |
| | | | 23 | | 14.46 | 8.52 | 0.01 | 71.99 | 99.53 |
| | 3 | 90.7721 | 5 | | 14.48 | 8.53 | 0.02 | 75.19 | 99.07 |
| | | | 23 | | 14.49 | 8.52 | <0.01 | 76.17 | ~100 |
| | Total Barren Solution | | | 7.200 | 14.38 | 8.52 | <0.01 | 64.62 | ~100 |
| Cycle-4 | 1 | 90.8396 | 5 | | 14.80 | 8.55 | 0.15 | 54.57 | 92.99 |
| | | | 23 | | 14.41 | 8.51 | 0.01 | 57.90 | 99.53 |
| | 2 | 90.7721 | 5 | | 14.58 | 8.54 | <0.01 | 61.60 | ~100 |
| | | | 23 | | 14.46 | 8.52 | 0.01 | 60.55 | 99.53 |
| | 3 | 90.8514 | 5 | | 14.44 | 8.53 | 0.01 | 62.93 | 99.53 |
| | | | 23 | | 14.41 | 8.52 | <0.01 | 61.34 | ~100 |
| | Total Barren Solution | | | 7.200 | 14.41 | 8.52 | <0.01 | 74.79 | ~100 |

(1) grams of ammonium thiosulfate per liter of solution

The foregoing discussion of the invention has been presented for purposes of illustration and description. The foregoing is not intended to limit the invention to the form of forms disclosed herein. For example, any feature of any disclosed embodiment may be combined in any compatible way with any other feature described in any other embodiment. Also, additional features or steps may be added to those features and steps described for any embodiment. Also, although the description of the invention has included description of one or more embodiments and certain variations and modifications, other variations and modifications are within the scope of the invention, e.g., as may be within the skill and knowledge of those skilled in the art considering the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, the term comprising and forms thereof as used herein do not limit the invention to exclude variations of or additions to embodiments of the invention described or claimed herein.

What is claimed is:

1. A method for removing precious metal from a cementation product including a substrate and precious metal in a precious metal-containing coating loaded onto the surface of the substrate, the cementation product resulting from cementation of precious metal from a leach solution containing dissolved precious metal, the method comprising selectively dissolving into a dissolution solution a portion, but less than substantially all, of the substrate so that at least a portion of the precious metal-containing coating is physically released from the substrate, wherein the dissolution solution is different than the leach solution.

2. The method of claim 1, wherein the selectively dissolving comprises dissolving no more than 25 weight percent of the substrate into the dissolution solution.

3. The method of claim 1, wherein the selectively dissolving comprises dissolving no more than 10 weight percent of the substrate into the dissolution solution.

4. The method of claim 1, wherein the selectively dissolving comprises dissolving no more than 2 weight percent of the substrate into the dissolution solution.

5. The method of claim 2, wherein at least 90 weight percent of the precious metal of the coating is physically released from the substrate during the removing.

6. The method of claim 5, wherein the selectively dissolving comprises dissolving into the dissolution solution no more than 1 weight percent of the precious metal from the cementation product.

7. The method of claim 1 wherein the selectively dissolving comprises agitating a mixture including the cementation product and the dissolution solution, thereby promoting the physical release of the portion of the precious metal-containing coating.

8. The method of claim 1, wherein the portion of the precious metal-containing coating, when released from the substrate, is in the form of a precious metal-containing fine particulate mixed with the dissolution solution.

9. The method of claim 8 further comprising separating at least a portion of the substrate from the dissolution solution and the fine particulate.

10. The method of claim 9, wherein the separating comprises size separation of the portion of the substrate from the fine particulate.

11. The method of claim 10, wherein the substrate is in particulate form having a weight average particle size of at least about one order of magnitude larger than the weight average particle size of the fine particulate.

12. The method of claim 9, wherein the separating is a first separating and the method further comprises, after the first separating, second separating at least a portion of the fine particulate from the dissolution solution.

13. The method of claim 12, wherein the second separating comprises filtering at least a portion of the fine particulate material from the dissolution solution.

14. The method of claim 8, wherein the selectively dissolving is a first selectively dissolving and the fine particulate comprises a component other than the precious metal; and the method further comprises, after the separating, second selectively dissolving at least a portion of the component from the fine particulate.

15. The method of claim 14, wherein the first selectively dissolving is conducted at an alkaline pH and the second selectively dissolving is conducted at an acidic pH.

16. The method of claim 8, further comprising, after the separating, using at least a portion of the substrate for cementation of precious metal from a leach solution including dissolved precious metal.

17. The method of claim 1, wherein the substrate is in a particulate form having a weight average particle size of larger than 100 mesh (0.149 mm).

18. The method of claim 1, wherein the dissolution solution comprises an aqueous ammoniacal solution.

19. The method of claim 18, wherein the dissolution solution comprises dissolved ammonium carbonate.

20. The method of claim 18, wherein the pH of the dissolution solution, as fed to the selectively separating, during the contacting, has a pH in a range of from pH 8 to pH 9.

21. The method of claim 1, wherein the substrate comprises a base metal in metallic form.

22. The method of claim 21, wherein the base metal is selected from the group consisting of copper, zinc, iron and combinations thereof.

23. The method of claim 1, comprising, prior to the selectively dissolving, preparing the cementation product, the preparing comprising:

(i) leaching a precious metal-containing mineral material with the leach solution to dissolve precious metal into the leach solution, (ii) after the leaching, cementation of precious metal from the leach solution onto the substrate, whereby precious metal is loaded onto the substrate, and (iii) separating the substrate loaded with precious metal from the leach solution.

24. The method of claim 23, wherein the leach solution comprises a thiosulfate lixiviant.

25. The method of claim 1, wherein the precious metal comprises gold.

26. A method for recovering precious metal from a precious metal-containing mineral material, the method comprising:

leaching the precious metal-containing mineral material to dissolve into a leach solution at least a portion of the precious metal;

after the leaching, cementation of at least a portion of the precious metal from the leach solution onto a particulate substrate comprising a base metal, to form a cementation product comprising a precious metal-containing coating supported on the particulate substrate;

after the cementation, selectively dissolving into a dissolution solution a portion, but less than substantially all, of the particulate substrate to physically release from the particulate substrate at least a portion of the precious metal-containing coating, wherein released precious metal-containing coating is in the form of a fine particulate mixed with the dissolution solution;

wherein the dissolution solution is different than the leach solution.

27. The method of claim 26, wherein the selectively dissolving comprises dissolving no more than 25 weight percent of the particulate substrate into the dissolution solution.

28. The method of claim 27, wherein during the selectively dissolving no more than 1 weight percent of the precious metal in the precious metal-containing coating is dissolved into the dissolution solution.

29. The method of claim 26 further comprising agitating a mixture including the cementation product and the dissolution solution during the selectively dissolving, thereby promoting the physical release of the precious metal-containing coating.

30. The method of claim 26, wherein the method further comprises:
first separating at least a portion of the particulate substrate from a mixture including the dissolution solution and at least a portion of the fine particulate to provide a recovered particulate substrate; and
after the first separating, second separating at least a portion of the fine particulate from the dissolution solution.

31. The method of claim 30, wherein the first separating comprises size separation of the particulate substrate and the fine particulate, the particulate substrate having a weight average particle size of at least one order of magnitude larger than the weight average particle size of the fine particulate.

32. The method of claim 30, wherein substantially all particles of the recovered particulate substrate are at least 100 mesh (0.149 mm) in size.

33. The method of claim 30, further comprising recycling at least a portion of the recovered particulate substrate for use in the cementation.

34. The method of claim 26, wherein the leach solution comprises an aqueous solution including a thiosulfate lixiviant for the precious metal, and the base metal of the particulate substrate comprises metallic copper.

35. The method of claim 34, wherein the particulate substrate consists essentially of copper particles of a size of at least 100 mesh (0.149 mm).

36. The method of claim 35, wherein the dissolution solution comprises an aqueous ammoniacal solution.

37. The method of claim 36, wherein the dissolution solution, as fed to the selectively dissolving, has a pH of from pH 8 to pH 9 and comprises an aqueous solution comprising dissolved ammonium carbonate.

38. The method of claim 26, wherein the leach solution comprises an aqueous cyanide solution and the base metal of the particulate substrate comprises metallic zinc.

39. The method of claim 26, wherein the particulate substrate has a weight average particle size of at least 20 mesh (0.841 mm).

40. The method of claim 26, wherein the precious metal comprises gold.

41. A method for recovering gold from a gold-bearing mineral material, comprising:
leaching gold from the mineral material into a leach solution including a thiosulfate lixiviant to dissolve gold into the leach solution in the form of at least one gold-thiosulfate complex;
after the leaching, cementation of at least a portion of the gold from the leach solution onto a base metal particulate substrate to form a cementation product including gold loaded on the base metal particulate substrate;
contacting the cementation product with a dissolution solution and dissolving into the dissolution solution a portion, but less than substantially all, of the base metal particulate substrate and physically releasing from the cementation product a fine particulate comprising gold, wherein the dissolution solution is different than the leach solution; and
separating at least a portion of the particulate substrate from the fine particulate.

42. The method of claim 41, wherein the particulate substrate, as separated from the fine particulate during the separating, has a weight average size of larger than 100 mesh (0.149 mm).

43. The method of claim 41, wherein the particulate substrate, as separated from the fine particulate during the separating, has a weight average size of larger than 20 mesh (0.841 mesh).

44. The method of claim 41, wherein the particulate substrate, as separated from the fine particulate during the separating, has a weight average size of larger than 10 mesh (1.68 mm).

45. The method of claim 41, wherein after the separating, the fine particulate is in a mixture with the dissolution solution, and the method further comprises separating at least a portion of the fine particulate from the dissolution solution.

46. The method of claim 41, wherein the dissolution solution comprises an ammoniacal aqueous solution at an alkaline pH.

47. The method of claim 46, wherein the dissolution solution comprises an aqueous solution including dissolved ammonium carbonate and ammonia.

48. The method of claim 46, wherein the dissolution solution is at a pH in a range of from pH 8 to pH 9.

49. The method of claim 41, further comprising, after the separating, recycling at least a portion of the particulate substrate to the cementation for cementation of additional gold.

50. The method of claim 41, wherein during the contacting, no more than 25 weight percent of the particulate substrate is dissolved into the dissolution solution during the dissolving.

51. The method of claim 50, after the separating, recycling at least a portion of the particulate substrate for reuse in the cementation, contacting, and separating, whereby the at least a portion of the particulate substrate is processed a plurality of times through the cementation, contacting and separating; and
wherein for each of the plurality of times that the at least a portion of the particulate substrate is processed through the contacting, no more than 25 weight percent of the particulate substrate is dissolved into the dissolution solution during the dissolving.

52. The method of claim 51, wherein for each of the plurality of times that the at least a portion of the particulate substrate is processed through the contacting, no more than 10 weight percent of the particulate substrate is dissolved into the dissolution solution during the dissolving.

53. The method of claim 51, wherein for each of the plurality of times that the at least a portion of the particulate substrate is processed through the contacting, no more than 2 weight percent of the particulate substrate is dissolved into the dissolution solution during the dissolving.

54. The method of claim 51, wherein for each of the plurality of times that the at least a portion of the particulate substrate is processed through the contacting, no more than 1 weight percent of the particulate substrate is dissolved into the dissolution solution during the dissolving.

55. The method of claim 51, wherein for each of the plurality of times that the at least a portion of the particulate substrate is processed through the contacting, at least 90 weight percent of the gold loaded on the particulate substrate is physically released from the particulate substrate.

56. The method of claim 51, comprising, after the separating and prior to the recycling, subjecting separated particulate substrate to size separation; and wherein at least a portion of oversize particles of the particulate substrate from the size separation are included in the at least a portion of the particulate substrate that is recycled during the recycling.

57. The method of claim 45, wherein the fine particulate comprises a component other than the gold; and the method comprises, after the separating of at least a portion of the fine particulate, selectively dissolving at least a portion of the component from the fine particulate.

58. The method of claim 57, wherein the contacting is conducted at an alkaline pH and the selectively dissolving is conducted at an acidic pH.

59. The method of claim 58, wherein the base metal of the particulate substrate comprises copper, and the component comprises copper.

60. The method of claim 33, comprising, after the first separating and prior to the recycling, subjecting separated particulate substrate to size separation; and wherein at least a portion of oversize particles of the particulate substrate from the size separation are included in the at least a portion of the particulate substrate that is recycled during the recycling.

* * * * *